United States Patent [19]

Koga et al.

[11] Patent Number: 5,664,635
[45] Date of Patent: Sep. 9, 1997

[54] CONTROL SYSTEM FOR INHIBITING UNINTENDED USE OF HYBRID ELECTRIC VEHICLE

[75] Inventors: Hisamitsu Koga, Okazaki; Naotake Kumagai, Tokyo; Tomiji Ohwada; Nobuya Furukawa, both of Okazaki; Masaaki Kato, Kyoto; Nobuyuki Kawamura, Okazaki, all of Japan

[73] Assignee: Mitsubishi Jidosha Kogyo Kabushiki Kaisha, Tokyo, Japan

[21] Appl. No.: 443,757

[22] Filed: May 18, 1995

[30] Foreign Application Priority Data

May 18, 1994 [JP] Japan ................... 6-103794

[51] Int. Cl.⁶ .................................................. B60K 28/00
[52] U.S. Cl. ................................. 180/65.3; 180/68.5
[58] Field of Search .................. 180/65.2, 65.3, 180/65.4, 65.5, 65.6, 65.7, 65.8, 68.5; 290/16, 17, 45, 50

[56] References Cited

U.S. PATENT DOCUMENTS

| | | | |
|---|---|---|---|
| 2,206,306 | 7/1940 | Sager | 180/68.5 |
| 3,497,027 | 2/1970 | Wild | 180/68.5 |
| 3,763,416 | 10/1973 | Jache | 180/68.5 |
| 4,132,942 | 1/1979 | Yamamoto | 290/50 |
| 4,306,156 | 12/1981 | Monaco et al. | 290/16 |
| 5,176,213 | 1/1993 | Kawai et al. | 180/65.4 |
| 5,359,228 | 10/1994 | Yoshida | 290/17 |

FOREIGN PATENT DOCUMENTS

| | | | |
|---|---|---|---|
| 2 248 952 | 5/1975 | France | 180/65.8 |
| 63-77302 | 4/1988 | Japan | 180/65.3 |

*Primary Examiner*—Richard M. Camby
*Assistant Examiner*—Frank Vanaman

[57] ABSTRACT

A hybrid electric vehicle is equipped with a combustion engine for driving a generator or a combustion engine for driving vehicle wheels. The hybrid electric vehicle has a battery unit, an electric drive motor, the combustion engine directly or indirectly usable for driving wheels, and a controller for controlling operations of the electric drive motor and the combustion engine. The hybrid electric vehicle is further provided with a microcomputer for determining whether or not the battery unit meets a predetermined specification. When the battery unit is determined as failing to meet the predetermined specification by the microcomputer, the controller limits an output of the electric drive motor or the combustion engine.

4 Claims, 6 Drawing Sheets

FIG. I
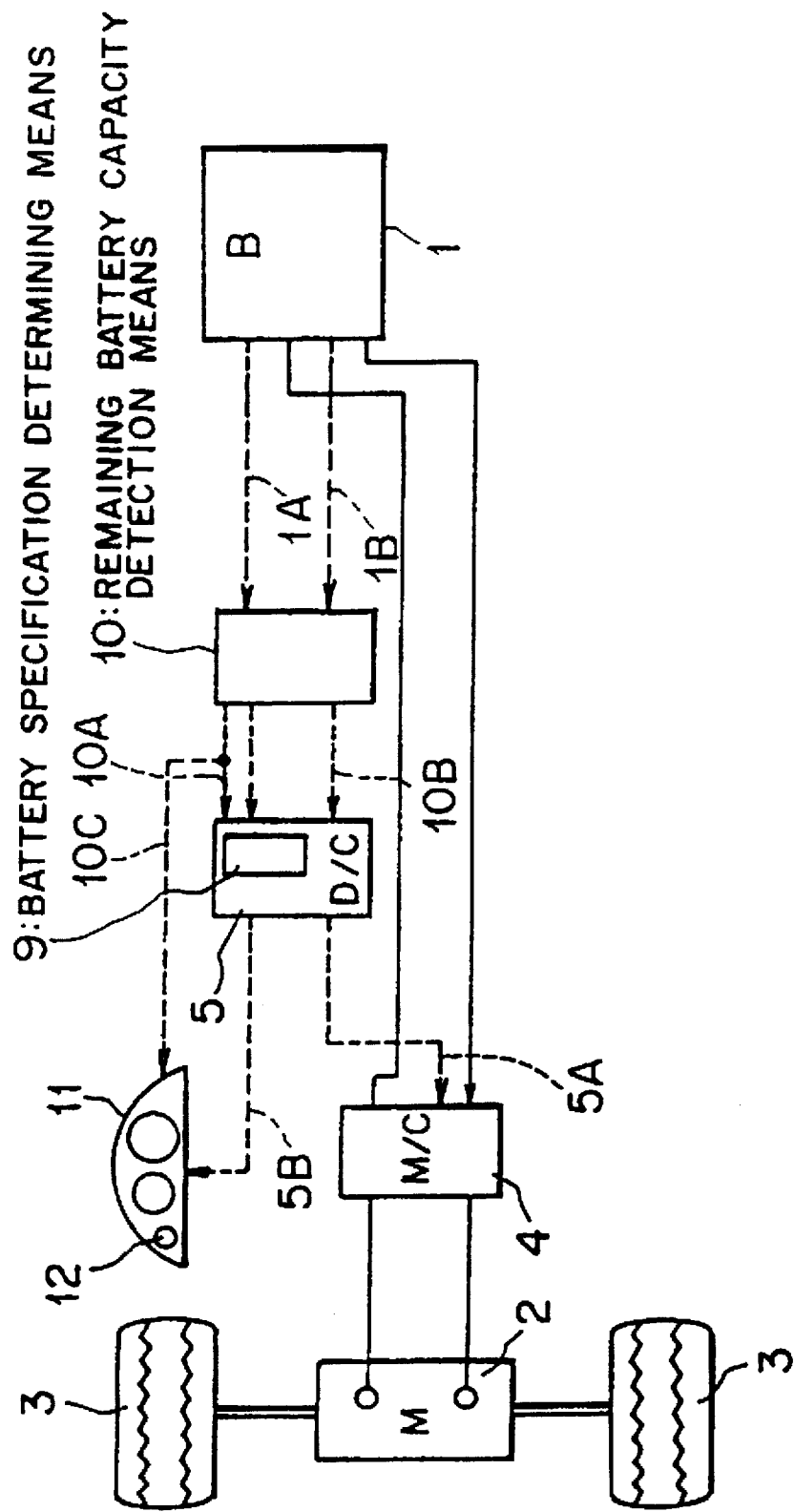

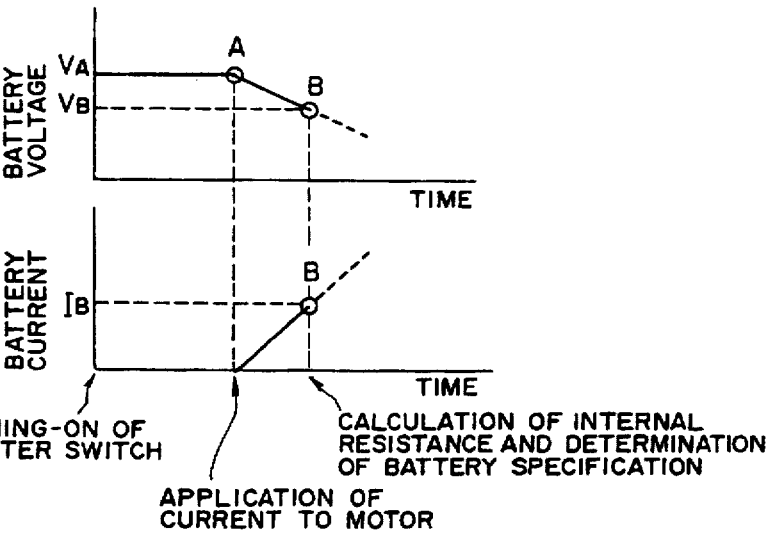
FIG. 2(a)
FIG. 2(b)
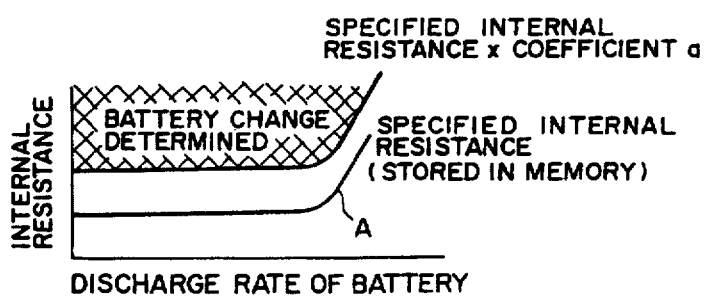
FIG. 3

CONTROL SYSTEM FOR INHIBITING UNINTENDED USE OF HYBRID ELECTRIC VEHICLE

BACKGROUND OF THE INVENTION a) Field of the Invention

This invention relates to an electric vehicle which runs by driving its wheels by an electric drive motor, and especially to a hybrid electric vehicle equipped with a combustion engine for driving a generator to recharge a battery unit or a running combustion engine for driving the wheels.

b) Description of the Related Art

There is an ever-increasing move toward protection of the global environment in recent years. In particular, the pollution of air due to mass consumption of fossil fuel has become a serious problem. Prevention of air pollution is therefore an extremely important theme for the protection of the global environment.

Presently, vehicles with engines relying upon fossil fuel such as gasoline or diesel oil are the main stream. Air pollution by exhaust gas from these vehicles has become an extremely serious problem especially in big cities in particular, in urban districts so that electric vehicles, which are free of exhaust gas, have been given a second look.

At the present stage, however, these electric vehicles still involve various problems which still have to be solved for their practical use. Electric vehicles have therefore not spread broadly to the public although they have been put into practical use in some fields. To make electric vehicles more practical, a variety of techniques has thus been proposed to date.

For example, increasing the distance coverable by a presently-available electric vehicle per a single charging inevitably requires mounting of more batteries because the capacity of each battery is limited. Use of such many batteries, however, leads to a substantial increase in the vehicle weight and also occupation of a large space inside the vehicle, resulting in the inconvenience that the power performance and riding comfort of the vehicle are deteriorated. Use of fewer batteries definitely makes it impossible to increase the distance coverable per charging.

Further, an electric vehicle has to be charged whenever the remaining capacity of its batteries as an energy source is decreased. Currently, however, this battery charging is not so easy as replenishment of gasoline. If an electric vehicle can no longer run due to insufficient battery capacity and stops on the road, it is not easy to bring the vehicle back to a running condition.

With a view to lessening the above-mentioned problems of such currently-available electric vehicles, electric vehicles equipped with an internal combustion engine mounted thereon, that is, so-called hybrid electric vehicles have been proposed.

Specific examples of such hybrid electric vehicles include series hybrid electric vehicles such as that shown in FIG. 8(a) and parallel hybrid electric vehicles such as that illustrated in FIG. 8(b).

The series hybrid electric vehicle shown in FIG. 8(a) is equipped with an internal combustion engine 7 and a generator 6 driven by the internal combustion engine 7, which are both mounted on the vehicle. When the capacity of a battery unit 1 becomes insufficient, the internal combustion engine 7 is operated to produce electric power by the generator 6. While charging the battery unit 1 by the electric power so generated, wheels 3 are driven by a motor 2 to permit running. This allows the electric vehicle to run even when the capacity of the battery unit 1 has become insufficient. Incidentally, FIG. 8(a) also depicts a motor controller 4 and a drive management controller 5. The motor controller 4 controls an output of the motor 2 in accordance with a control signal from the drive management controller 5.

On the other hand, the parallel hybrid electric vehicle illustrated in FIG. 8(b) carries an internal combustion engine 8 in parallel with an electric drive motor 2, so that the internal combustion engine 8 can also drive its associated wheels 3 in addition to or in place of driving the remaining wheels 3 by the electric drive motor 2. The parallel hybrid electric vehicle can therefore run by the internal combustion engine 8 even when the capacity of the battery unit 1 has become insufficient.

These hybrid electric vehicles can each increase its running distance by auxiliary operation of its internal combustion engine 8 while reducing the exhaust gas and the air pollution.

In these hybrid electric vehicles, the battery units inevitably become large, thereby imposing a significant weight load on them.

On the other hand, such hybrid electric vehicles such as mentioned above, can each run by obtaining electric energy from the generator driven by the internal combustion engine and driving the motor with the electric energy (series hybrid electric vehicles) or by directly driving wheels with the internal combustion engine (parallel hybrid electric vehicles). Accordingly, there is the possibility that with a view toward enhancing the running performance of a hybrid electric vehicle, its user may remove the battery unit by himself or may replace the specified battery unit by a battery unit lighter in weight and smaller in capacity than the specified battery unit to reduce the weight of the vehicle.

Advantages of the hybrid electric vehicle may however not be fully appreciated if the hybrid electric vehicle is driven with its battery unit removed or with its specified battery unit replaced by a battery unit of smaller capacity.

Further, there is the potential problem that the hybrid electric vehicle may be driven more frequently while operating its internal combustion engine. This may hence lead to a failure in fully achieving the protection of the environment, the primary objective of electric vehicles.

SUMMARY OF THE INVENTION

In view of the foregoing problems, the primary object of the present invention is to provide a hybrid electric vehicle which can prevent running with its specified battery unit removed.

In one aspect of the present invention, there is thus provided a hybrid electric vehicle having a rechargeable battery unit, an electric drive motor capable of driving wheels by electric power from said battery unit, a combustion engine usable to indirectly drive the wheels, and control means for controlling operations of the electric drive motor and the combustion engine, comprising:

means for determining whether or not the battery unit meets a predetermined specification, whereby, when said battery unit is determined as failing to meet the predetermined specification by the battery specification determining means, the control means controls at least one of said electric drive motor and the combustion engine so that an output from the electric drive motor is limited.

Owing to the above construction, electric power is usually fed from the battery unit to the electric drive motor so that the wheels are driven by the electric drive motor. Whenever needed, the combustion engine may also be used indirectly to drive the wheels. If the battery unit is determined as failing to meet the predetermined specification by the battery specification determining means, at least one of the electric drive motor and the combustion engine is controlled so that the output of the electric drive motor is limited. As a result, it is possible to prevent the vehicle from being driven with its battery unit removed or with its battery unit replaced by a battery unit of small capacity. The performance of the vehicle can therefore be maintained as specified.

The battery specification determining means may be designed to determine that the battery unit fails to meet the predetermined specification when the battery unit has an internal resistance greater than a preset value. As an alternative, the battery specification determining means may be designed to determine that the battery unit fails to meet the predetermined specification when the battery unit has a low voltage lower than a preset value. These designs directly detect the performance of the battery unit, thereby permitting correct determination as to whether the specification of the battery unit is correct.

The battery specification determining means may be designed to perform the determination on the basis of information from remaining battery capacity detection means which can detect the internal resistance and voltage of the battery unit. This makes it possible to easily practice the present invention at low cost.

The hybrid electric vehicle may further comprise alarm means for producing an alarm for a driver, the alarm means being arranged within an interior of the vehicle, wherein when the battery unit is determined as failing to meet the predetermined specification by the battery specification determining means, the control means actuates the alarm means. The alarm means can instantaneously advise the driver of whether the specification of the battery unit is correct or not.

The alarm means may be a battery alarm lamp arranged on a meter panel inside the interior of the vehicle. The battery alarm lamp can minimize an increase in the manufacturing cost and also an increase in the weight of the vehicle.

The combustion engine may be arranged as a dynamo combustion engine for driving a generator to charge the battery unit, and the control means may be designed to limit feeding of electric power to the electric drive motor when the battery unit is determined as failing to meet the predetermined specification by the battery specification determining means. This makes it possible to prevent a so-called series hybrid electric vehicle from being driven with its battery unit removed or with its battery unit replaced by a battery unit of small capacity. The performance of the series hybrid electric vehicle can therefore be maintained as specified.

The hybrid electric vehicle may further comprise a starter switch having a stop mode in which the electric drive motor and the combustion engine are held stopped and a drive mode into which the starter switch is brought from the stop mode to start the electric drive motor and to hold the electric drive motor in an operated state subsequent to the start. It is also possible to design that immediately after the starter switch is changed over from the stop mode to the drive mode, the battery specification determining means performs the determination and the control means controls the electric drive motor on the basis of information from the battery specification determining means. This permits correct determination of the specification of the battery unit. If the battery unit is removed or the battery unit is replaced by one having a small capacity, the motor cannot be started so that the vehicle is prevented from being driven. As a consequence, this makes the driver mount a battery unit of the predetermined specification on the vehicle.

The control means can be designed to limit the output from the electric drive motor by inhibiting operation of the electric drive motor or the combustion engine. This can prevent any attempt to drive the vehicle by removing the battery unit or by changing the battery unit to a battery unit of smaller capacity. As a consequence, this makes the driver mount a battery unit of the predetermined specification on the vehicle. The performance of the vehicle can therefore be maintained as specified.

The control means can be designed to limit the output from the electric drive motor by limiting a maximum output torque of the electric drive motor or the combustion engine. If the driver attempts to drive the vehicle with the battery unit removed or with the battery unit replaced by a battery unit of smaller capacity, the output is limited so that the driver cannot drive the vehicle as he desires. This can therefore make the driver mount a battery unit of the predetermined specification on the vehicle, so that the performance of the vehicle can be maintained as specified.

The control means may be designed to limit the output from the electric drive motor by gradually reducing a maximum output torque when the electric drive motor or the combustion engine operates faster than a preset rotational speed. If the driver attempts to drive the vehicle with the battery unit removed or with the battery unit replaced by a battery unit of smaller capacity, the output is limited so that the driver cannot drive the vehicle as he desires. Upon uphill driving, starting or the like in which the rotational speed of the electric drive motor is low, it is however still possible to obtain torque of such a degree as not impair the running. A limitation to torque is practically effected during high-speed driving. It is therefore possible to motivate the driver to mount a battery of the predetermined specification on the vehicle while retaining satisfactory climbing and sufficient accelerating ability from standstill. Further, the performance of the vehicle can be maintained as specified.

In another aspect of the present invention, there is also provided a hybrid electric vehicle having a battery unit chargeable by external charging means, an electric drive motor capable of driving wheels by electric power from the battery unit, a combustion engine usable to indirectly drive the wheels, and control means for controlling operations of the electric drive motor and said combustion engine, comprising:

means for determining whether the battery unit has been removed, whereby, when the battery unit is determined to have been removed by the battery removal determination means, the control means controls at least one of said electric drive motor and the combustion engine so that an output from the electric drive motor is limited.

Owing to the above construction, electric power is usually fed from the battery unit to the electric drive motor so that the wheels are driven by the electric drive motor. Whenever needed, the combustion engine may also be used indirectly to drive the wheels. If the battery unit is determined to have been removed by the battery removal determination means, at least one of the electric drive motor and the combustion engine is controlled by the control means so that the output of the electric drive motor is limited. As a result, it is possible to prevent the vehicle from being driven with its battery unit removed or with its battery unit replaced by a battery unit of small capacity. The performance of the vehicle can therefore be maintained as specified.

In a further aspect of the present invention, there is also provided a hybrid electric vehicle having a battery unit chargeable by external charging means, an electric drive motor capable of driving wheels by electric power from the battery unit, a combustion engine usable to directly drive the wheels, and control means for controlling operations of the electric drive motor and the combustion engine, comprising:

means for determining whether the battery unit meets a predetermined specification, whereby, when the battery unit is determined as failing to meet the predetermined specification by the battery specification determining means, the control means performs control so that an output from the combustion engine is limited.

Owing to the above construction, electric power is usually fed from the battery unit to the electric drive motor so that the wheels are driven by the electric drive motor. Whenever needed, the combustion engine may also be used to drive the wheels directly. If the battery unit is determined as failing to meet the predetermined specification by the battery specification determining means, the output of the combustion engine is limited by the control means. As a result, it is possible to prevent the vehicle from being driven with its battery unit removed or with its battery unit replaced by a battery unit of small capacity. The performance of the vehicle can therefore be maintained as specified.

In a still further aspect of the present invention, there is also provided a hybrid electric vehicle having a battery unit chargeable by external charging means, an electric drive motor capable of driving wheels by electric power from the battery unit, a combustion engine usable to directly drive the wheels, and control means for controlling operations of the electric drive motor and the combustion engine, comprising:

means for determining whether the battery unit has been removed, whereby, when the battery unit is determined to have been removed by the battery removal determination means, the control means performs control so that an output from the combustion engine is limited.

Owing to the above construction, electric power is usually fed from the battery unit to the electric drive motor so that the wheels are driven by the electric drive motor. Whenever needed, the combustion engine may also be used directly to drive the wheels. If the battery unit is determined to have been removed by the battery removal determination means, the output of the combustion engine is limited by the control means. As a result, it is possible to prevent the vehicle from being driven with its battery unit removed or with its battery unit replaced by a battery unit of small capacity. The performance of the vehicle can therefore be maintained as specified.

BRIEF DESCRIPTION OF THE DRAWINGS

FIG. 1 is a simplified block diagram showing a functional construction of an essential part of a hybrid electric vehicle according to a preferred embodiment of the present invention;

FIGS. 2(a) and 2(b) are diagrams illustrating details of control for the prevention of running with a specified battery unit removed in the hybrid electric vehicle according to the embodiment of the present invention, in which battery voltage change characteristics at the time of a start of an electric drive motor are shown;

FIG. 3 is a diagram illustrating a map employed for the prevention of running with the specified battery unit removed in the hybrid electric vehicle according to the embodiment of the present invention;

DESCRIPTION OF THE PREFERRED EMBODIMENTS

Figure 4:
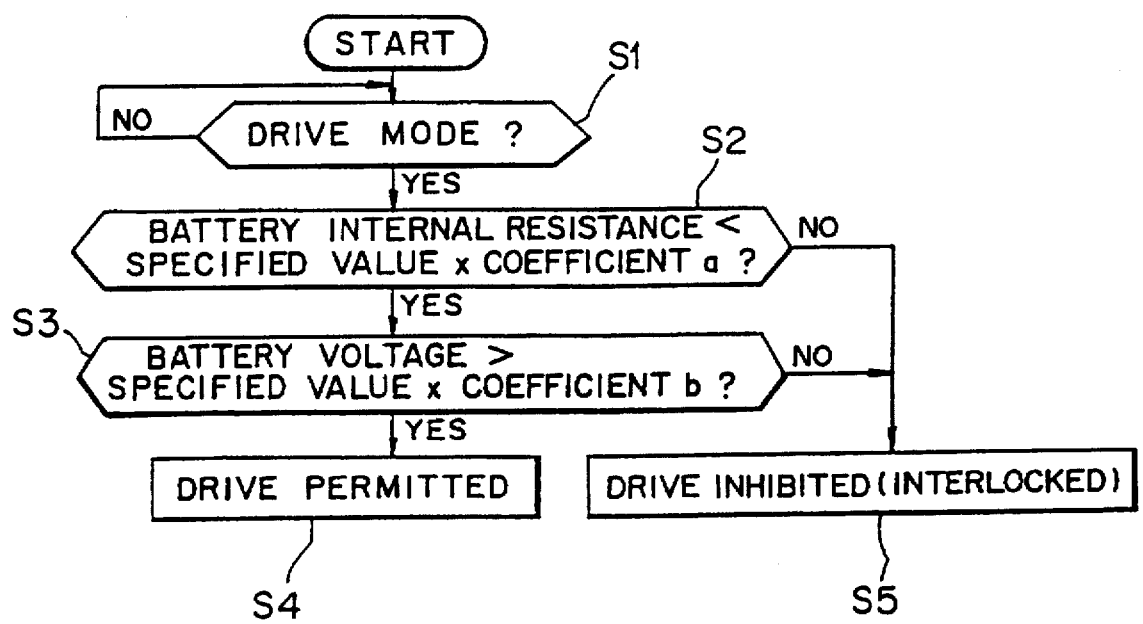
FIG. 4 is a flow chart illustrating the flow of control operations in the hybrid electric vehicle according to the embodiment of the present invention.

A hybrid electric vehicle according to a preferred embodiment of the present invention will hereinafter be described with reference to the accompanying drawings.

In the present embodiment, the hybrid electric vehicle will be described as being of the series type.

In FIG. 1, numeral 1 indicates a battery unit. This battery unit 1 can be repeatedly charged by an external charger (not illustrated) which the vehicle is not equipped with. Designated at numeral 2 is a motor (electric drive motor) to which electric power is supplied from the battery unit 1. Drive wheels 3 of the vehicle are driven by the motor 2. An output of the motor 2 is controlled by a motor controller 4. The motor controller 4 controls the output of the motor 2 on the basis of an output demand operation by a driver (namely, a stroke of an unillustrated accelerator pedal), the state of current operation of the motor 2, or the like. The motor controller 4, upon detection of a braking command from depression or the like of an unillustrated brake pedal, changes the function of the motor 2 from a driving source to a generator so that a regenerative braking is performed. In other words, braking force is applied while generating electric power by using rotational energy from the drive wheels 3.

Figure 8A:
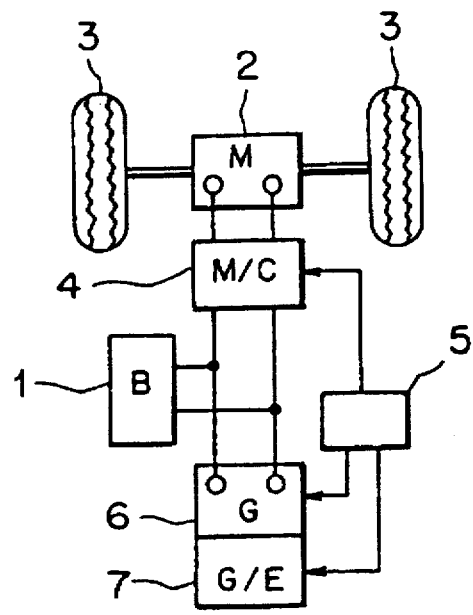
FIG. 8(a) is a schematic block diagram of a conventional series hybrid electric vehicle.

Although not illustrated in FIG. 1, the vehicle is provided with a generator and an internal combustion engine, as illustrated in FIG. 8(a). The generator is driven by the internal combustion engine. Electric power produced by the generator is fed to the battery unit 1 and the motor [see FIG. 8(a)].

Owing to this arrangement, it is possible to drive the vehicle while feeding electric power to the motor 2 by using the internal combustion engine, for example, in a suburb or an area where the degree of air pollution is low and to drive the vehicle by electric power stored in the battery unit 1 in an urban area or in an area where the air pollution is severe.

A description will now be made of a control system for the motor 2. As is illustrated in FIG. 1, a control signal for the motor controller 4 is set by a drive management controller 5 as control means and is outputted through a signal line 5A. This drive management controller 5 systematically controls the motor 2 and the internal combustion engine according to the state of running of the hybrid electric vehicle.

The drive management controller 5 is internally equipped with battery specification determining means 9. This battery specification determining means 9 determines, based on information from the battery unit 1, whether or not the battery unit 1 is a specified battery unit which meets prescribed conditions.

If the battery unit 1 has been removed or has been replaced by a smaller battery unit having a capacity smaller than the specified capacity, the battery specification determining means 9 detects it. Where the battery unit 1 does not meet the predetermined specification, the drive management controller 5 sets a control signal for the motor controller 4 on the basis of detection information from the battery specification determining means 9 and limits an output of the motor 2 so that, for example, the motor 2 is controlled in a drive inhibited (interlocked) state.

This determination of the specification of the battery unit 1 is performed whenever the driver operates a starter switch of the hybrid electric vehicle (which is equivalent to an ignition key of an ordinary vehicle) to start the vehicle. For example, it is designed that upon changing over the starter switch from a stop mode to a drive mode to start the motor 2 (or the internal combustion engine), the determination of the specification of the battery unit 1 is performed by the battery specification determining means 9 immediately after the change-over. To bring the vehicle into the drive inhibited (interlocked) state, the feeding of electric power to the motor 2 is cut off to prevent starting of the vehicle. When the battery unit 1 meets the predetermined specification, the vehicle can be started and driven as usual.

The battery specification determining means 9 performs the determination from two detection information, that is, an internal resistance and a voltage of the battery unit 1. Even if only one of these information fails to meet the prescribed condition, it is determined that the battery unit 1 has been removed or has been replaced by a battery out of the predetermined specification.

In the illustrated embodiment, the internal resistance and the voltage of the battery unit 1 are detected based on detection information from remaining battery capacity detection means 10 which an electric vehicle is generally equipped with.

The terminal voltage and discharge current of the battery unit 1 are inputted to the remaining capacity detection means 10 via the signal line 1A and a signal line 1B, respectively. The remaining battery capacity detection means 10 then calculates the remaining capacity of the battery unit 1 from the terminal voltage and discharge current. Voltage information and current information from the remaining battery capacity detection means 10 are inputted to the battery specification determining means 9 via signal lines 10A,10B, respectively. From the voltage and current values so detected, the internal resistance and voltage of the battery unit 1 can then be detected.

Here, the use of the internal resistance and voltage as standards for the determination of the specification of the battery unit 1 can be attributed to reasons to be described hereinafter. First, the internal resistance of the battery unit 1 and its weight (which corresponds to the capacity of the battery unit 1) are generally in inverse proportion to each other. If the battery unit 1 is replaced by a battery unit which is out of the predetermined specification, its internal resistance is out of the specification. Measurement of the internal resistance therefore makes it possible to determine whether or not the battery unit 1 is of the prescribed specification.

A description will next be made of the detection of the internal resistance of the battery unit 1. Upon starting the motor 2, the battery voltage and the battery current vary as shown in FIGS. 2(a) and 2(b). FIG. 2(a) illustrates variations of the battery voltage, whereas FIG. 2(b) depicts variations of the battery current. In both diagrams, time is commonly plotted along the abscissas. When the driver turns on the starter switch to change over the mode from the stop mode to the drive mode, a voltage is applied to the motor 2 as shown in FIG. 2(a), and the battery voltage decreases as the current I to the motor 2 increases. From the current $I_B$ and the voltage drop $(V_A-V_B)$ between the initiation of the application of the current to the motor 2 (a time point A) and a time point B which is immediately after the initiation of the application of the current, the internal resistance of the battery unit 1 is calculated in accordance with the following formula:

$$\text{Internal resistance}=(V_A-V_B)/I_B$$

The specification of the battery unit 1 is then determined from the relationship between the internal resistance, which has been calculated by the above equation, and the discharge rate of the battery unit 1 at that time.

Namely, as indicated by a curve A in FIG. 3, the internal resistance of the battery unit 1 is correlated to its discharge rate. When the battery discharge rate becomes greater than a certain level, the internal resistance also tends to increase correspondingly. According to the present invention, the relationship between the discharge rate and internal resistance of the battery unit of the predetermined specification is stored in a memory in advance, and the product of each specified value of internal resistance multiplied by a predetermined value (coefficient a) in view of an error and the like is adopted as a threshold for the determination. If a detected value of internal resistance is equal to or greater than its corresponding threshold (namely, falls within a battery change determination area shown in FIG. 3), the internal resistance is determined as being too high so that the battery unit is determined not to be of the predetermined specification. Incidentally, the map shown in FIG. 3 is stored in a ROM of the drive management controller 5.

Turning next to the voltage, the voltage becomes 0 when the battery unit 1 has been removed from the vehicle. Removal of the battery unit 1 can therefore be detected immediately. If a battery unit, which is out of the predetermined specification and consisting of a smaller number of batteries is mounted, the voltage must be lower. Here again, it is therefore possible to detect the removal of the specified battery unit 1.

Since the determination is made based on the voltage, the product of each specified value of voltage multiplied by a predetermined value b (0<b<1) is adopted as a threshold in view of scattered voltages or the like of individual battery units. A battery unit whose voltage is equal to or lower than the threshold is determined to be out of the predetermined specification, whereby an interlocking control signal is set by the drive management controller 5.

Incidentally, as illustrated in FIG. 1, the remaining battery capacity detection means 10 is connected via a signal line 10C to a meter panel 11 arranged in an interior of the vehicle. Accordingly, information on the discharge rate of the battery unit 1 is displayed by a voltage meter (not shown) or a battery alarm lamp on the meter panel 11.

Further, the meter panel 11 is also inputted via a signal line 5B with information from the drive management controller 5 and is provided with an alarm lamp 12 as alarm means. When the drive management controller 5 interlocks the vehicle via the signal line 5A on the basis of information from the battery specification determining means 9, the alarm lamp 12 is actuated to advise the driver that the battery unit does not meet the predetermined specification.

Because the hybrid electric vehicle according to the present embodiment is constructed as described above, it is operated, for example, according to the flow chart shown in FIG. 4.

This flow chart is now described. First, when the starter switch is turned on, it is determined in step S1 whether or not the starter switch has been changed over to the drive mode. If not, the routine returns to "START". The routine circulates through this route until the starter switch is changed over to the drive mode.

When the starter switch is changed over to the drive mode, the routine then advances to step S2. It is determined whether or not the internal resistance of the battery unit 1 is lower than the predetermined value (specified value × coefficient a). If the internal resistance of the battery unit 1 is higher, the routine advances to step S5 so that a control signal of "DRIVE INHIBITED (INTERLOCKED)" is set.

If the internal resistance of the battery unit 1 is lower than the predetermined value (specified value × coefficient a), the routine advances to step S3 in which it is determined whether or not the battery voltage is higher than the predetermined value (specified value × coefficient b).

If the battery voltage is equal to or lower than the predetermined value, the routine advances to step S5 in which the output of the motor 2 is limited by the drive management controller 5 and, for example, a control signal of "DRIVE INHIBITED (INTERLOCKED)" is set. If the battery voltage is higher than the predetermined value, the routine advances to step S4 in which a control signal of "DRIVE PERMITTED" is set to allow the driver to run the vehicle.

Accordingly, when the driver has changed over the starter switch into the drive mode to start the hybrid electric motor of this invention from standstill, the voltage $V_A$ of the battery unit 1 is read by the battery specification determining means 9. When a predetermined time has elapsed next, the voltage $V_B$ and current $I_B$ of the battery unit 1 are read so that the voltage and internal resistance of the battery unit are detected.

Using the map shown in FIG. 3, it is determined, with the discharge rate also taken into consideration, if the internal resistance of the battery unit 1 is equal to or smaller than the predetermined value (threshold). With respect to the voltage, on the other hand, it is determined if it is equal to or higher than the preset threshold. Only when these two conditions are met, the internal combustion engine or the motor 2 mounted on the vehicle is started.

If the internal resistance of the battery unit is higher than the predetermined value, or the voltage of the battery is lower than the preset value, the motor 2 is controlled by the drive management controller 5 so that, for example, the vehicle can no longer be started even if the starter switch is operated. In addition, the alarm lamp is turned on to alarm the driver that the battery unit 1 is out of the predetermined specification.

This can prevent the vehicle from being driven with the battery unit 1 removed or with the battery unit 1 replaced by a battery of smaller capacity, thereby making it possible to retain the performance of the hybrid electric automobile.

Although the present embodiment has been described using the series hybrid electric vehicle primarily, it can also be applied to a parallel hybrid electric vehicle. In the above described embodiment, the meter panel 11 is equipped with the alarm lamp 12 and this alarm lamp 12 is used as alarm means. An ordinary battery alarm lamp can however be arranged to function as alarm means instead of additionally arranging the alarm lamp 12 on the meter panel 11.

As the battery specification determining means 9, a variety of devices can be adopted besides the one incorporated in the above described embodiment, for example, such as a sensor for detecting the weight of the battery unit 1 or a sensor for detecting the size (dimensions) of the battery unit 1. Further, instead of the battery specification determining means 9, it is also possible to arrange such battery removal determination means 13 as permitting direct determination as to whether or not the battery unit 1 has been removed.

Figure 5:
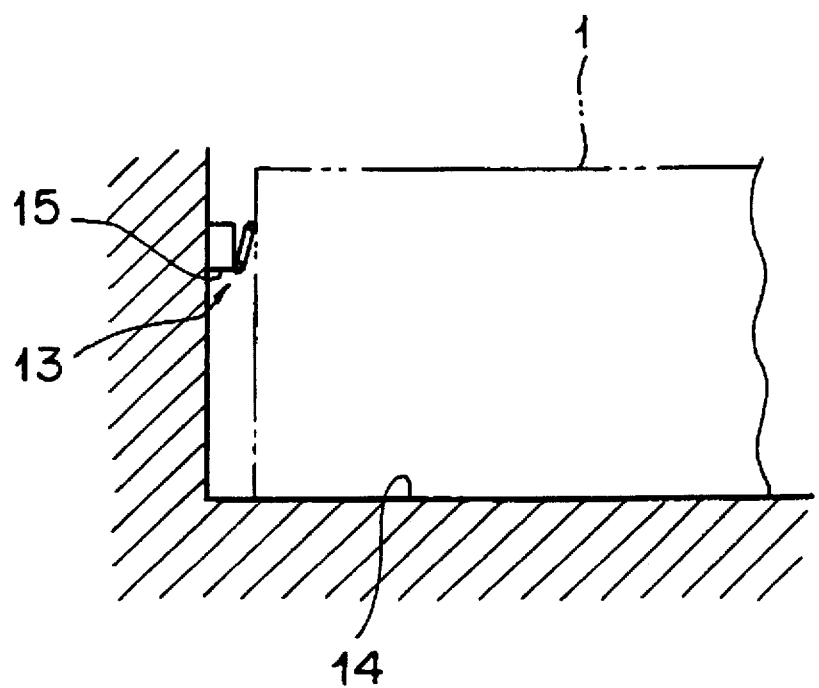
FIG. 5 shows a specific example of battery removal determination means as a modification of battery specification determining means in the hybrid electric vehicle according to the embodiment of the present invention.

As the battery removal determination means 13, it is possible, as shown in FIG. 5, to arrange a limit switch 15 having a contact which can detect whether the battery unit 1 has been mounted at a specified mount position 14. Depending on whether the limit switch 15 is on or off, it is possible to determine whether the battery unit 1 has been removed or not.

In the above modification, the contact of the limit switch 15 can be of such a design that the limit switch 15 is turned on when the battery unit 1 is mounted. Conversely, this contact can also be of such a design that a current is cut off when the battery unit 1 is mounted.

As an alternative of the battery removal determination means 13, it is also possible to adopt a sensor which detects the weight of the battery unit 1.

The above-described embodiment is designed in such a way that, when the battery unit 1 is not of the predetermined specification, the feeding of electric power to the motor 2 is cut off by the drive management controller 5 to prevent the vehicle from being started. The control by the drive management controller 5, however, is not limited to such a drive inhibited (interlocked) mode. The control can be performed in different ways, for example, by limiting the output of the motor 2 to motivate the driver to put the battery unit 1 of the predetermined specification.

Here, specific examples of the limitation of the output of the electric drive motor 2 will be described with reference to FIGS. 6 and 7. In each of these diagrams, a solid line indicates performance characteristics when the output of the electric drive motor 2 is not limited, while a broken line indicates performance characteristics when the output of the electric drive motor 2 is limited.

Figure 6:
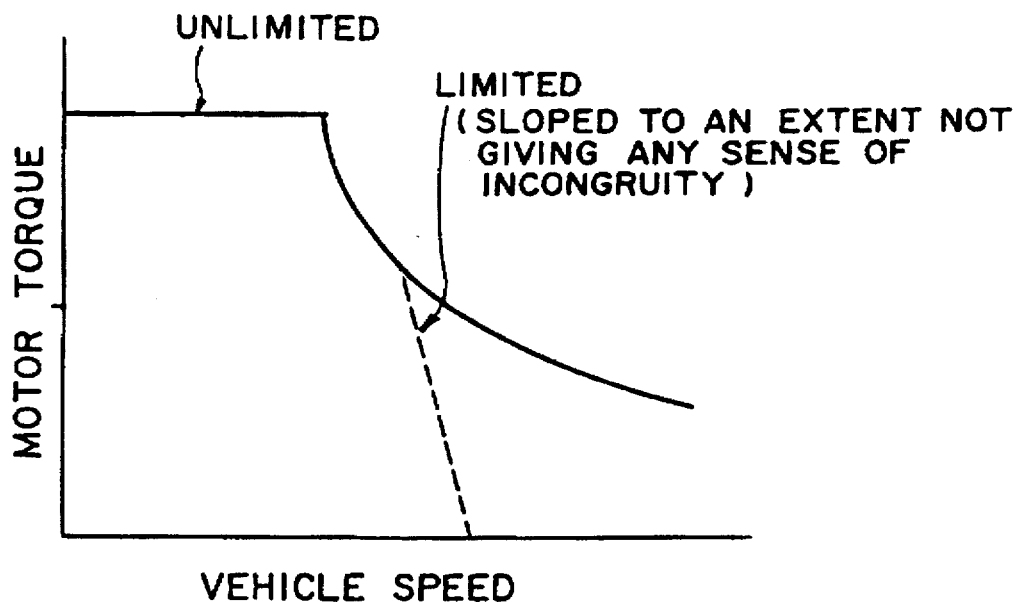
FIG. 6 is a diagram illustrating a specific example of output limiting characteristics of the fuel use limiter-equipped hybrid electric vehicle according to the embodiment of the present invention.

According to the limitation shown in FIG. 6, the torque of the electric drive motor 2 is gradually reduced in a range where the vehicle speed (or the rotational speed of the electric drive motor 2) is equal to and higher than a predetermined value. When the vehicle speed (or the rotational speed of the electric drive motor 2) is lower than the predetermined value, no torque limitation is therefore performed so that desired drive power can be obtained while driving uphill or upon making a start. When the vehicle speed (or the rotational speed of the electric drive motor 2) is equal to or higher than the predetermined value, on the other hand, the torque is limited. Owing to this torque limitation, the driver perceives an insufficient output from the vehicle so that the driver is urged to perform an external charging.

Figure 7:
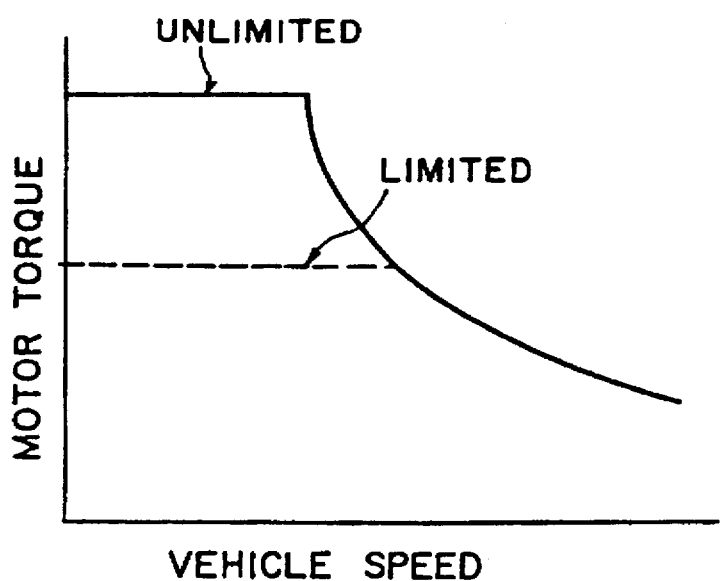
FIG. 7 is a diagram illustrating another specific example of the output limiting characteristics of the fuel use limiter-equipped hybrid electric vehicle according to the embodiment of the present invention.

According to the limitation depicted in FIG. 7, a limitation is imposed on the maximum torque irrespective of the rotational speed of the electric drive motor 2. By making the driver perceive insufficiency in the maximum torque of the vehicle, the driver is urged to perform the external charging.

Although the limitation can be practiced in either way, the output limitation method shown in FIG. 6 is preferred from the practical standpoint which has taken into consideration the performance while driving uphill or upon making a start.

In such a series hybrid electric vehicle as shown in the above embodiment, it is also possible to control the internal combustion engine 7 instead of the motor 2 when the battery unit 1 is not of the predetermined specification or the battery unit 1 has been removed. In this case, it is also possible to adopt such a design that the internal combustion engine 7 is prevented from being started or the output of the internal combustion engine 7 is limited, for example, with such a characteristic as illustrated in FIG. 6 or FIG. 7.

In the series hybrid electric vehicle, both the motor 2 and the internal combustion engine 7 can be controlled when the battery unit 1 is not of the predetermined specification or the battery unit 1 has been removed. In other words, it is possible to control in such a way that the motor 2 and the internal combustion engine 7 are both prevented from being started or the outputs of the motor 2 and the internal combustion engine 7 are both limited, for example, with such a characteristic as illustrated in FIG. 6 or FIG. 7.

It is, however, preferred to limit the output of the motor 2, because in the series hybrid electric vehicle, a limitation to the output of the motor 2 makes it possible to operate the internal combustion engine 7 while maintaining it within an operation region good gas mileage and exhaust gas.

Figure 8B:
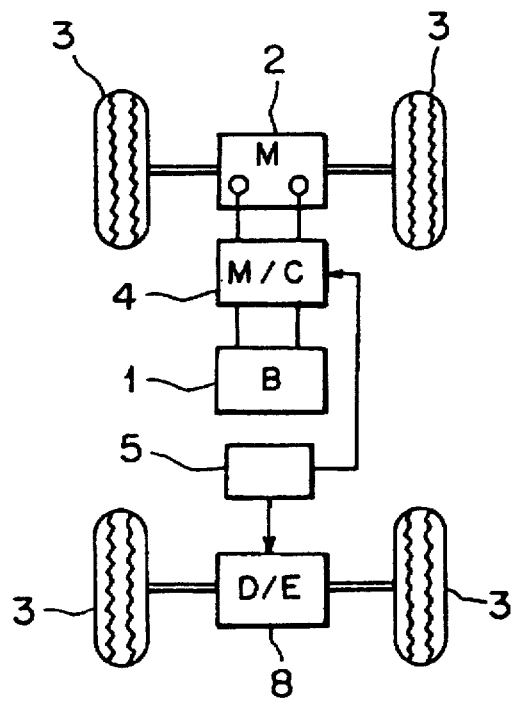
FIG. 8(b) is a schematic block diagram of a conventional parallel hybrid electric vehicle.

Although the above-described embodiment was applied to the series hybrid electric vehicle, it can be applied equally to the above-mentioned parallel hybrid electric vehicle shown in FIG. 8(b). Namely, the parallel hybrid electric vehicle can be provided with the battery specification determining means 9 or the battery removal determination means 13 so that the internal combustion engine 8 can be controlled when the battery unit 1 is not of the predetermined specification or the battery unit 1 has been removed. In this case, it is also possible to adopt such a design that the internal combustion engine 7 is prevented from being started or the output of the internal combustion engine 7 is limited, for example, with such a characteristic as illustrated in FIG. 6 or FIG. 7.

It is also to be noted that an external combustion engine can be used instead of an internal combustion engine in the present invention. In the series hybrid electric vehicle, the internal combustion engine 7 for driving the generator can be replaced by an external combustion engine. Likewise, an external combustion engine for driving the wheel can substitute for the internal combustion engine 8 in the parallel hybrid electric vehicle.

What is claimed is:

1. A hybrid electric vehicle, comprising:

a rechargeable battery unit;

an electric drive motor which drives wheels of said vehicle by an electric power from said rechargeable battery unit;

a generator which charges said rechargeable battery unit;

a combustion engine which drives said generator;

a controller which controls operations of said electric drive motor and said combustion engine;

a determining unit which determines whether said rechargeable battery unit has been removed or replaced with another battery unit which fails to meet a predetermined specification;

wherein said controller limits the output from said electric drive motor by inhibiting operation of at least one of said electric drive motor and said combustion engine when said determining unit determines that said rechargeable battery unit has been removed or said rechargeable battery unit has been replaced with said another battery unit.

2. A hybrid electric vehicle, comprising:

a recharge able battery unit;

an electric drive motor which drives wheels of said vehicle by an electric power from said rechargeable battery unit;

a generator which charges said rechargeable battery unit;

a combustion engine which drives said generator;

a controller which controls operations of said electric drive motor and said combustion engine;

a determining unit which determines whether said rechargeable battery unit has been removed or replaced with another battery unit which fails to meet a predetermined specification;

wherein, when said determining unit determines that said rechargeable battery unit has been removed or said rechargeable battery unit has been replaced with said another battery unit, said controller limits the output from said electric drive motor by gradually reducing a maximum output torque when at least one of said electric drive motor and said combustion engine operates faster than a preset rotational speed.

3. A hybrid electric vehicle, comprising:

a rechargeable battery unit;

an electric drive motor which drives wheels of said vehicle by an electric power from said rechargeable battery unit;

a combustion engine which indirectly drives said wheels; and a control unit which controls operations of said electric drive motor and said combustion engine;

a battery removal determining unit which determines whether said rechargeable battery unit is being mounted in a specific mounting position;

wherein said control unit gradually reduces an output torque of said electric drive motor to limit an output of said electric drive motor, when said battery removal determination unit determines that said rechargeable battery unit is not being mounted in said specific mounting position and a rotational speed of said electric drive motor exceeds a preset rotational speed.

4. A hybrid electric vehicle, comprising:

a rechargeable battery unit;

an electric drive motor which drives wheels of said vehicle by an electric power from said rechargeable battery unit;

a combustion engine which directly drives said wheels;

a controller which controls operations of said electric drive motor and said combustion engine; and a battery removal determination unit which determines whether said rechargeable battery unit is being mounted at a specified mounting position;

wherein said controller limits an output of said electric drive motor, when said battery removal determination unit determines that said rechargeable battery unit has been removed.

* * * * *